Patented June 6, 1950

2,510,297

UNITED STATES PATENT OFFICE 2,510,297

DEHYDROGENATED ROSIN REFINING

Alfred L. Rummelsburg, Wilmington, Del., assignor to Hercules Powder Company, Wilmington, Del., a corporation of Delaware No Drawing. Application February 23, 1949,
Serial No. 77,978

16 Claims. (Cl. 260—108)

This invention relates to the refining of a modified rosin and more particularly to the adsorbent earth refining of a dehydrogenated rosin.

The adsorbent earth refining of ordinary rosin to pale grades is well known to the art. For example, U. S. 1,505,438 discloses that a gasoline solution of ordinary rosin may be contacted with fuller's earth in order to produce a rosin considerably lighter in color than the original rosin. Likewise U. S. 2,281,078 discloses a similar decolorizing process using an acid-treated adsorbent earth for color removal. These adsorbent earth refined rosins, however, still contain colorless components which make them unsuited for use as the emulsifier in emulsion polymerization of vinyl compounds.

Adsorbent earths also have been used in the refining of certain dehydrogenated rosin fractions. U. S. 2,191,307, for example, discloses the process of separating a modified rosin such as dehydrogenated rosin by means of selective solvents into chemically different components, each component of which may then be further purified by treatment with an adsorbent earth such as fuller's earth. Although certain of these fractions are satisfactory for use in the emulsion polymerization of vinyl compounds, the need long has been felt for a simpler and more economical procedure for preparing a dehydrogenated rosin which would be suitable for use in the form of its soap in processes for the emulsion polymerization of vinyl compounds.

Dehydrogenated or disproportionated rosin ordinarily is prepared from wood or gum rosin which has been refined by familiar processes prior to dehydrogenation. Dehydrogenated rosin of high grade thus may be obtained since, in addition to the purification effected through the prior refining treatment, the dehydrogenation process itself may lead to a purer product through destruction of minor constituents in the rosin. For example, ordinary solvent-refined wood rosin of "I" grade may be dehydrogenated with a palladium catalyst on an adsorbent carrier in accordance with U. S. 2,239,555 to produce an "N" grade dehydrogenated rosin. Such dehydrogenated rosins, however, contain small amounts of impurities which adversely affect the yields of polymers obtained using the dehydrogenated rosins in the form of their alkali metal salts as emulsifying agents in the polymerization of vinyl compounds, such as in the copolymerization of butadiene and styrene.

In accordance with this invention it has been found that a suitable material for use in emulsion polymerization of vinyl compounds may be obtained by dissolving the whole dehydrogenated rosin product, obtained directly from the disproportionation reaction mixture following separation of the dehydrogenation catalyst, in a suitable nonpolar solvent and contacting the resulting solution with an adsorbent earth.

In carrying out the process in accordance with this invention, the entire dehydrogenated rosin product is dissolved in a volatile hydrocarbon solvent such as gasoline or benzene and contacted with an adsorbent earth such as fuller's earth by passing, for example, the rosin solution through a column packed with the adsorbent earth. Upon emission from the packed column the rosin solution may be heated under reduced pressure to remove the solvent and thereby recover the purified dehydrogenated rosin. When such a dehydrogenated rosin is saponified with an aqueous alkali such as sodium hydroxide, the resulting soap is found to give good yields of polymers from the polymerization of vinyl compounds. The adsorbent earth refining process of this invention acts to remove the small amount of impurities which, when present in dehydrogenated rosin, are deleterious to obtaining high polymer yields.

The following examples constitute specific embodiments of the invention.

Example I

A column having a length of 91.44 cm. and a diameter of 6.35 cm. was packed with 1160 g. of fuller's earth, which had previously been calcined at 280° C. for 3 hours. Two thousand cubic centimeters of narrow range gasoline then was run into the column under an atmosphere of carbon dioxide. Seven hundred seventy-eight grams of a whole dehydrogenated rosin product, obtained directly from the continuous dehydrogenation of a rosin grading N according to the United States Official Naval Stores Standard with a palladium on activated charcoal catalyst (1.25% palladium) at a temperature of 235° to 285° C. and a feed rate varying from about 640 g. to about 720 g. per minute under an atmosphere of carbon dioxide, was dissolved in approximately 2910 cc. of narrow range gasoline. The gasoline solution was run slowly through the column packed with fuller's earth. The total of the gasoline originally in the column, of the gasoline solution of the rosin, and of 2000 cc. of narrow range gasoline used finally to wash out the column was collected in three fractions. The first fraction of about 4000 cc. was collected over a period of 4 hours, the second fraction of about 2000 cc. was taken over a period of about 2 hours, and the third fraction constituted mainly the 2000 cc. of gasoline used as a wash.

The same general procedure was followed on a slightly smaller scale, using a column 100 cm. in length and 4.5 cm. in diameter packed with 600 g. of calcined fuller's earth. Eight hundred cubic centimeters of narrow range gasoline was run into the column, after which a solution of 300 g. of the dehydrogenated rosin product in about 1700 cc. (1500 g.) of narrow range gasoline was passed through the column. The first fraction collected was about 1500 cc., the second about 800 cc., and the third constituted mainly a 1600 cc. portion of gasoline as a wash.

The corresponding fractions of the two runs were combined and the solvent removed under an atmosphere of carbon dioxide by heating the solutions at a temperature of 160° C. under a pressure of about 15 mm. The characteristics of the various combined fractions are given in Table 1:

Table 1

| Fractions | Per Cent Yield | Acid No. | Bromine No. | Specific Rotation (⅞ in. cube) |
|---|---|---|---|---|
| 1 | 21 | 163 | 67 | +49.1 |
| 2 | 29 | 164.5 | 68 | +50.0 |
| 3 | 36 | 163.2 | 64 | +50.1 |

In order to test the purified dehydrogenated rosin in emulsion polymerization, the various fractions were saponified with aqueous sodium hydroxide, and an amount of each resulting solution sufficient to provide 2.5 parts of the sodium salt of the dehydrogenated rosin was charged into a glass polymerization vessel. To these soap solutions were added 0.15 part of potassium persulfate dissolved in 25 parts of water, 0.325 part of dodecyl mercaptan, 12.5 parts of styrene, 37.5 parts of butadiene-1,3, 1.00 part of an activating salt solution, and sufficient water to bring the total water content to 90 parts. The 1.00 part of activating salt solution contained 0.00525 part of 78% ferric sulfate nonahydrate, 0.075 part of sodium pyrophosphate decahydrate, and 0.00019 part of cobaltous chloride hexahydrate dissolved in 0.92 part of distilled water. The polymerization vessels then were sealed and agitated at 50° C. for 15 hours. The emulsions then were run into open vessels containing 5 parts of a 2% solution of phenyl-β-naphthylamine, coagulated with salt and alcohol, washed with water at temperatures below 60° C., and dried at a temperature not exceeding 60° C.

The various fractions of purified dehydrogenated rosin when tested in this manner gave an average yield of 72.6% of the amount of copolymer theoretically obtainable. The original unrefined dehydrogenated rosin product under identical conditions of testing gave a copolymer yield of 68.6%, and the adsorbed material recovered from the fuller's earth gave no yield of copolymer.

Example II

The general procedure of Example I was followed using Percol, a special grade of California bentonite treated with sulfuric acid, as the adsorbent earth. The column was charged with 400 g. of Percol which had been calcined at about 425–480° C. for 2 hours. A 15% solution in narrow range gasoline of a whole dehydrogenated rosin product having an acid number of 160 and obtained by a process similar to that of Example I, was passed through the column at a rate of approximately 15 cc. per minute, the solution being blanketed at all times with an atmosphere of carbon dioxide. Fractions of the refined dehydrogenated rosin weighing 70, 518, 321, and 311 g., respectively, and having acid numbers of about 167, were collected following removal of the solvent from the corresponding portions of solution which had passed through the column.

The various fractions upon conversion to the corresponding sodium salts were used as emulsifying agents in the copolymerization of butadiene-1,3 and styrene following the general procedure used in Example I with the exception that no activating salt solution was included in the formulation. The average yield of copolymer obtained was 66.9%. The original unrefined dehydrogenated rosin product under identical conditions of testing gave an average copolymer yield of 65.9%.

Example III

One thousand parts of a whole dehydrogenated rosin product similar to that used in Example I was dissolved in 3000 parts of benzene, and the resulting solution was agitated with 800 parts of Percol (precalcined at 400° C. for 4 hours) at about 75° C. for 4 hours, utilizing a nitrogen atmosphere. The Percol then was filtered from the solution and washed at room temperature with four portions of benzene, each portion constituting 1000 parts. These wash solutions were combined with the original filtrate and the solvent removed by evaporation at a final temperature of 180° C. and pressure of 20 mm. There was recovered 950 parts of refined dehydrogenated rosin which, when used as in Example I in the copolymerization of butadiene and styrene, gave a 5% increase in yield of copolymer as compared to the original unrefined dehydrogenated rosin.

Example IV

Following the procedure of U. S. 2,239,555, 500 parts "I" wood rosin (selective solvent refined) was heated to 200° C. in an atmosphere of carbon dioxide and 10.0 parts palladium on activated carbon catalyst (5% palladium) was added. The rosin-catalyst mixture was agitated by passing a current of carbon dioxide gas through the mixture. The temperature rose rapidly to 240° C. after addition of the catalyst and there was a rapid evolution of hydrogen. Within 5 minutes the disproportionation reaction was complete and the reaction mixture was promptly cooled to 150° C. and dissolved in a narrow boiling range gasoline. The catalyst was removed by filtration and the filtrate was adjusted to a concentration of 15% by weight. A sample of the solution was freed of solvent in vacuo for analyses and for emulsion polymerization tests. Data on these analyses and tests are given in Table 2.

A portion of the dehydrogenated rosin solution amounting to 665 parts by weight and containing 100 parts dehydrogenated rosin was slurried at 30° C. for 15 minutes with 100 parts acid-treated calcined (600° F. for 2 hours) bentonite (Percol). The bentonite was then removed by filtration and the refined dehydrogenated rosin was recovered from the filtrate by distilling off the solvent in vacuo. The recovered refined dehydrogenated rosin was then analyzed and tested as the emulsifier in emulsion polymerization. Data on these analyses and tests are given in Table 2.

For comparison of the refining procedure as applied to the dehydrogenated rosin, the same procedure of refining with the acid-treated calcined bentonite was applied to "I" wood rosin. The refining treatment improved the color from "I" to "N" and increased the acid number from 160 to 169. The refined "I" wood rosin was also tested in the emulsion polymerization test. Data are given in Table 2.

The following emulsion polymerization test procedure was used for comparison of the rosins of this example. A sample of rosin or rosin acid equivalent to 2.5 parts sodium salt based on its acid number was placed in a glass polymerization vessel and neutralized by the addition of the calculated amount of 0.5 N sodium hydroxide solution. To the soap solution was added 0.15 part potassium persulfate dissolved in 25 parts water, 0.25 part dodecyl mercaptan, 12.5 parts styrene, 38 parts butadiene and sufficient water to bring the total water up to 90 parts. The air in the vessel was then displaced by allowing exactly 0.5 part butadiene to boil off at room temperature before capping. The polymerization vessels after capping were agitated at a controlled temperature of 50° C. so that an emulsion was maintained. At intervals, 5 ml. samples of the emulsion were withdrawn and added to 1 ml. of a 2% solution of hydroquinone to stop polymerization, and the yield of polymer was determined by evaporating to dryness, weighing, and correcting for nonpolymeric solids.

In Table 2 are given the characteristics of the rosins and resin acids used in the tests along with the yields of polymer obtained. The rosins were those prepared in the manner described above from the sample of "I" wood rosin listed. The pure resin acids were specially purified rosin acids which had been freed of related rosin acids and other impurities by careful crystallization.

A sample of the above dehydrogenated "I" wood rosin, refined in a similar manner to that described in Example IV using Super Filtrol in place of Percol at a slurrying temperature of 75° C., gave a refined rosin which in the polymerization test gave a 70% yield of polymer in 15.2 hours. Super Filtrol is also an acid-treated bentonite and was calcined at 600° F. for two hours to activate it before use.

polymerization is more pronounced in the case of dehydrogenated rosins containing the most potent polymerization inhibitors, this process of refining is particularly adapted to the improvement of dehydrogenated rosins containing such polymerization inhibitors. Dehydrogenated wood rosins contain the most potent inhibitors which are not destroyed or removed by efficient dehydrogenation processes but rather appear to be formed thereby. These inhibitors or their precursors are not readily removed from wood rosin by simple refining either with selective solvents or adsorbent clays before dehydrogenation. However, they are readily removed from the rosin by the process of the present invention after the rosin has been subjected to dehydrogenation. Thus, the process of refining of this invention gives particularly outstanding results when applied to a dehydrogenated wood rosin containing polymerization inhibitors. While the chemistry involved is not well understood, it is believed that the polymerization inhibitors which are removed are phenolic bodies. Although wood rosins are known to contain substances which are phenolic in character, both gum and wood rosins contain substances which on dehydrogenation could be converted to phenolic bodies. Since the refining process gives outstanding improvement to dehydrogenated rosins but not to the original rosins, it is apparent that the dehydrogenation process converts the inhibitor to a form in which it is particularly strongly adsorbed by adsorbent earths so that it is removable by the present process. Since pure resin acids, after dehydrogenation, do not contain the polymerization inhibitors which the process of this invention is most effective in removing, the rosins to which this process will normally be applied with outstanding success are the dehydrogenated natural rosins prepared by dehydrogenation of rosins grading "N" or darker.

The dehydrogenation or disproportionation reaction is carried out by contacting the rosin or rosin material at an elevated temperature with an active hydrogenation catalyst in the absence of added hydrogen to effect a dehydrogenation or disproportionation reaction. Catalysts such as palladium, platinum, nickel, copper chromite, Table 2

| Example | Rosin | AN | Refining Yield | Ultraviolet Analyses | | Emulsion Polymerization Soaps of Rosins as Emulsifier (Time (hr.) Required for Designated Conversion) | |
|---|---|---|---|---|---|---|---|
| | | | | Abietic Acid | Dehydroabietic Acid | 25% | 70% |
| | | | Per cent | Per cent | Per cent | | |
| IVA | Wood rosin—selective solvent refined to "I" grade. | 160 | | 27 | <10 | [1] 30 | |
| IVB | Wood rosin—refined from "I" to "N" grade by adsorbent earth. | 169 | 82 | 34 | <10 | [1] 30 | |
| IVC | Dehydrogenated "I" wood rosin | 166 | | None | 54 | 10 | 18.5 |
| IVD | Adsorbent earth—refined dehydrogenated "I" wood rosin. | 169 | 75 | None | 60 | 9 | 16.5 |
| IVE | Pure abietic acid | 185 | | 100 | | 31 | Ca. 100 |
| IVF | Pure dehydroabietic acid | 187 | | | 100 | 6.2 | 12.4 |

[1] Using three times standard amount of sodium persulfate catalyst.

The dehydrogenated or disproportionated rosin product which is utilized in accordance with this invention may be prepared by the dehydrogenation or disproportionation of natural rosin such as gum or wood rosin, or heat-treated or isomerized natural rosins. Since the improvement in the dehydrogenated rosin for use in emulsion and the like are suitable and may be supported on a carrier such as granular alumina, fibrous asbestos, or activated charcoal. Dehydrogenation or disproportionation with a palladium catalyst, for example, may be conducted either by a batchwise or continuous procedure. Thus, the rosin may be agitated with about 5 to about 20% by weight of a palladium catalyst supported on activated carbon (1 to 2% palladium) at about 150° to about 300° C. for about 1 to about 5 hours. In the continuous process the molten rosin flows over the supported palladium catalyst at a temperature within the range of about 225° to about 300° C. to provide a contact time of about ¼ hour to about 1 hour.

The dehydrogenated or disproportionated rosin resulting from the continuous process may be used per se as the whole dehydrogenated rosin product in accordance with this invention. In the event, however, that the dehydrogenated rosin product was prepared by the batch procedure, the rosin should be maintained at a sufficiently high temperature so that it may be separated from the catalyst as by decantation or filtration. Separation of the dehydrogenated or disproportionated rosin from the active hydrogenation catalyst is the only step which is carried out prior to use of the rosin material in the process of this invention. In other words, the rosin material of this invention is the entire rosin product resulting from the dehydrogenation or disproportionation reaction. The rosin material is not subjected to any process of distillation or separation into component parts prior to application of the adsorbent earth refining treatment.

Although the examples have only shown the use of fuller's earth and activated acid-treated bentonites as the adsorbent earths in the process of this invention, other similarly constituted materials may be used. Other adsorbent earths, both natural and synthetic, which are operable are montmorillanite, bentonite, Floridin, Coenite, which is a magnesium silicate, Magnesol, which is a synthetic magnesium silicate, Filtrol and Super Filtrol, which are acid-treated bentonites, and the like. It usually is desirable to preactivate the adsorbent earth by a treatment such as with hydrochloric acid or sulfuric acid. It also is desirable to calcine the earth prior to use. This may be done in the case of fuller's earth, for example, by heating the earth at a temperature between about 280° and about 500° C. for about 2 to about 6 hours. During the refining process, best results are obtained if the amount of earth is from about 0.1 to about 4 times by weight the amount of dehydrogenated or disproportionated rosin which is to be processed. A preferable range is from about 0.5 to about 3 times as much earth as rosin.

The examples have shown the use of narrow range gasoline and benzene as solvents for the dehydrogenated rosin. Narrow range gasoline is a solvent which is substantially free of aromatic hydrocarbons and has a boiling point between about 96° and about 127° C. and has a minimum aniline point of 60° C., the latter value indicating that substantially no aromatic hydrocarbons are present. The specific gravity of this particular gasoline is approximately 0.7100 at 20° C. as compared to water at 20° C. Typical samples of the material exhibit specific gravities of 0.7090 and 0.7138 at 20° C. In general, the solvents which are operable in accordance with this invention are the nonpolar, volatile hydrocarbons of the paraffinic, naphthenic and aromatic series. More specifically, the solvents are those petroleum hydrocarbon solvents such as, for example, gasoline, petroleum ether, heptane, hexane, and normally gaseous petroleum hydrocarbons held in the liquid phase by elevated pressure, low temperature, or both, and the aromatic hydrocarbon solvents such as benzene, toluene, xylene, diisopropylbenzene and the like. Mixtures of these solvents may be used. The concentration of the dehydrogenated rosin in such solvents may be within the range of about 5% to about 80% by weight and desirably within the range of about 15% to about 30% by weight. A particularly applicable concentration upon this basis is about 20%.

The refining process may be carried out either by a batchwise or a continuous procedure. The examples have shown batch processes, but it is quite apparent that a series of reactors may be used in conjunction with one another in order to make the process continuous. In continuous operations it has been found that four reactors in series give optimum results. In continuous operations it also is possible to substitute a reactor containing fresh adsorbent earth in place of a reactor in which the adsorbent earth has lost its refining power. Revivification of the spent adsorbent earth may then be carried out without interrupting the continuous process. Revivification may be effected merely by extracting the adsorbent earth with a solvent, such as alcohol or acetone, which is capable of dissolving the adsorbent materials.

The refining process may be carried out at a temperature between about 0° and about 125° C. The preferred temperature is between about 20° and about 90° C., and a practical and useful range is between about 20° and about 45° C. The examples have shown the use of carbon dioxide and nitrogen for the purpose of furnishing an inert atmosphere during the refining process, but other inert gases also may be used.

As shown by the examples the alkali metal salts of the refined dehydrogenated rosin are useful in the copolymerization of butadiene and styrene. The alkali metal salts may be prepared by treating the dehydrogenated rosin with alkali metal compounds which are basic in characteristics, such as the hydroxides and carbonates of sodium, potassium, etc. These alkali metal salts are useful not only in the copolymerization of butadiene and styrene but also are generally useful in the polymerization of the conjugated butadiene hydrocarbons, butadiene and its derivatives such as isoprene, dimethyl butadiene, chloroprene, etc., and other compounds containing the vinyl group such as styrene, acrylonitrile, etc. The alkali metal salts of the refined dehydrogenated rosin have been found to be excellent emulsifying agents, particularly in the preparation of the copolymers of butadiene and styrene or acrylonitrile, isoprene and styrene or acrylonitrile, and other rubberlike copolymers as well as in the preparation of polymers such as polyvinyl chloride, polyvinyl acetate, polystyrene, polymethylmethacrylate, polyvinylidene chloride, and the various other addition polymers which may be prepared by the emulsion technique.

The process is accordance with this invention affords a simple and economical means of preparing a purified dehydrogenated rosin. The process is advantageous over previous methods of refining dehydrogenated rosin in that it is applicable to the whole dehydrogenated rosin product resulting from the reaction on rosin of an active hydrogenation catalyst in the absence of added hydrogen. The present process eliminates the necessity of breaking down the whole dehydrogenated rosin product into purer individual components by separation procedures involving distillation, selective solvent action, and the like.

This application is a continuation-in-part of copending application, Serial Number 681,145, filed July 2, 1946, now abandoned.

What I claim and desire to protect by Letters Patent is:

1. The process of removing emulsion polymerization inhibitors from a dehydrogenated rosin containing the same but consisting essentially of dehydrogenated rosin acids which comprises dissolving the entire dehydrogenated rosin product in a volatile hydrocarbon solvent, and contacting the resulting solution with an adsorbent earth in an amount equal to about 0.1 to 4 times the weight of the dehydrogenated rosin until the dehydrogenated rosin is substantially free of emulsion polymerization inhibitors.

2. The process of removing emulsion polymerization inhibitors from a dehydrogenated rosin containing the same but consisting essentially of dehydrogenated rosin acids which comprises dissolving the entire dehydrogenated rosin product in a volatile hydrocarbon solvent to a concentration of about 5% to about 80% by weight, and contacting the resulting solution with an adsorbent earth in an amount equal to about 0.1 to 4 times the weight of the dehydrogenated rosin until the dehydrogenated rosin is substantially free of emulsion polymerization inhibitors.

3. The process of removing emulsion polymerization inhibitors from a dehydrogenated rosin containing the same but consisting essentially of dehydrogenated rosin acids which comprises dissolving the entire dehydrogenated rosin product in a volatile hydrocarbon solvent to a concentration of about 15% to about 30% by weight, and contacting the resulting solution with an adsorbent earth in an amount equal to about 0.1 to 4 times the weight of the dehydrogenated rosin until the dehydrogenated rosin is substantially free of emulsion polymerization inhibitors.

4. The process of removing emulsion polymerization inhibitors from a dehydrogenated rosin containing the same but consisting essentially of dehydrogenated rosin acids which comprises dissolving the entire dehydrogenated rosin product in a volatile hydrocarbon solvent to a concentration of about 20% by weight, and contacting the resulting solution with an adsorbent earth in an amount equal to about 0.1 to 4 times the weight of the dehydrogenated rosin until the dehydrogenated rosin is substantially free of emulsion polymerization inhibitors.

5. The process of removing emulsion polymerization inhibitors from a dehydrogenated rosin containing the same but consisting essentially of dehydrogenated rosin acids which comprises dissolving the entire dehydrogenated rosin product in a volatile hydrocarbon solvent, and contacting the resulting solution with an adsorbent earth at a temperature between about 0° and about 125° C. in an amount equal to about 0.1 to 4 times the weight of the dehydrogenated rosin until the dehydrogenated rosin is substantially free of emulsion polymerization inhibitors.

6. The process of removing emulsion polymerization inhibitors from a dehydrogenated rosin containing the same but consisting essentially of dehydrogenated rosin acids which comprises dissolving the entire dehydrogenated rosin product in a volatile hydrocarbon solvent, and contacting the resulting solution with an adsorbent earth at a temperature between about 20° and about 90° C. in an amount equal to about 0.1 to 4 times the weight of the dehydrogenated rosin until the dehydrogenated rosin is substantially free of emulsion polymerization inhibitors.

7. The process of removing emulsion polymerization inhibitors from a dehydrogenated rosin containing the same but consisting essentially of dehydrogenated rosin acids which comprises dissolving the entire dehydrogenated rosin product in a volatile hydrocarbon solvent, and contacting the resulting solution with an adsorbent earth at a temperature between about 20° and about 45° C. in an amount equal to about 0.1 to 4 times the weight of the dehydrogenated rosin until the dehydrogenated rosin is substantially free of emulsion polymerization inhibitors.

8. The process of removing emulsion polymerization inhibitors from a dehydrogenated rosin containing the same but consisting essentially of dehydrogenated rosin acids which comprises dissolving the entire dehydrogenated rosin product in a petroleum hydrocarbon solvent, and contacting the resulting solution with an adsorbent earth in an amount equal to about 0.1 to 4 times the weight of the dehydrogenated rosin until the dehydrogenated rosin is substantially free of emulsion polymerization inhibitors.

9. The process of removing emulsion polymerization inhibitors from a dehydrogenated rosin containing the same but consisting essentially of dehydrogenated rosin acids which comprises dissolving the entire dehydrogenated rosin product in a petroleum hydrocarbon solvent, and contacting the resulting solution with fuller's earth in an amount equal to about 0.1 to 4 times the weight of the dehydrogenated rosin until the dehydrogenated rosin is substantially free of emulsion polymerization inhibitors.

10. The process of removing emulsion polymerization inhibitors from a dehydrogenated rosin containing the same but consisting essentially of dehydrogenated rosin acids which comprises dissolving the entire dehydrogenated rosin product in gasoline, and contacting the resulting solution with fuller's earth in an amount equal to about 0.1 to 4 times the weight of the dehydrogenated rosin until the dehydrogenated rosin is substantially free of emulsion polymerization inhibitors.

11. The process of removing emulsion polymerization inhibitors from a dehydrogenated rosin containing the same but consisting essentially of dehydrogenated rosin acids which comprises dissolving the entire dehydrogenated rosin product in a petroleum hydrocarbon solvent, and contacting the resulting solution with acid-treated bentonite in an amount equal to about 0.1 to 4 times the weight of the dehydrogenated rosin until the dehydrogenated rosin is substantially free of emulsion polymerization inhibitors.

12. The process of removing emulsion polymerization inhibitors from a dehydrogenated rosin containing the same but consisting essentially of dehydrogenated rosin acids which comprises dissolving the entire dehydrogenated rosin product in gasoline, and contacting the resulting solution with acid-treated bentonite in an amount equal to about 0.1 to 4 times the weight of the dehydrogenated rosin until the dehydrogenated rosin is substantially free of emulsion polymerization inhibitors.

13. The process of removing emulsion polymerization inhibitors from a dehydrogenated rosin containing the same but consisting essentially of dehydrogenated rosin acids which comprises dissolving the entire dehydrogenated rosin product in an aromatic hydrocarbon solvent, and contacting the resulting solution with an adsorbent earth in an amount equal to about 0.1 to 4 times the weight of the dehydrogenated rosin until the dehydrogenated rosin is substantially free of emulsion polymerization inhibitors.

14. The process of removing emulsion polymerization inhibitors from a dehydrogenated rosin containing the same but consisting essentially of dehydrogenated rosin acids which comprises dissolving the entire dehydrogenated rosin product in an aromatic hydrocarbon solvent, and contacting the resulting solution with acid-treated bentonite in an amount equal to about 0.1 to 4 times the weight of the dehydrogenated rosin until the dehydrogenated rosin is substantially free of emulsion polymerization inhibitors.

15. The process of removing emulsion polymerization inhibitors from a dehydrogenated rosin containing the same but consisting essentially of dehydrogenated rosin acids which comprises dissolving the entire dehydrogenated rosin product in benzene, and contacting the resulting solution with acid-treated bentonite in an amount equal to about 0.1 to 4 times the weight of the dehydrogenated rosin until the dehydrogenated rosin is substantially free of emulsion polymerization inhibitors.

16. The process of preparing a refined dehydrogenated rosin substantially free of emulsion polymerization inhibitors which comprises contacting a rosin with an active hydrogenation catalyst in the absence of added hydrogen to effect a substantial dehydrogenation of said rosin, dissolving the entire dehydrogenated rosin product in a volatile hydrocarbon solvent, and contacting the resulting solution with an adsorbent earth in an amount equal to about 0.1 to 4 times the weight of the dehydrogenated rosin until the dehydrogenated rosin is substantially free of emulsion polymerization inhibitors.

ALFRED L. RUMMELSBURG.

REFERENCES CITED

The following references are of record in the file of this patent:

UNITED STATES PATENTS

| Number | Name | Date |
| --- | --- | --- |
| 2,239,555 | Fleck et al. | Apr. 22, 1941 |
| 2,281,078 | Price et al. | Apr. 28, 1942 |